United States Patent
Henson

(10) Patent No.: US 10,132,189 B2
(45) Date of Patent: Nov. 20, 2018

(54) VARIABLE VANE CONTROL SYSTEM

(71) Applicant: ROLLS-ROYCE PLC, London (GB)

(72) Inventor: Nigel Henson, Derby (GB)

(73) Assignee: ROLLS-ROYCE PLC, London (GB)

( * ) Notice: Subject to any disclaimer, the term of this patent is extended or adjusted under 35 U.S.C. 154(b) by 511 days.

(21) Appl. No.: 15/059,469

(22) Filed: Mar. 3, 2016

(65) Prior Publication Data

US 2016/0273378 A1    Sep. 22, 2016

(30) Foreign Application Priority Data

Mar. 17, 2015   (GB) .................................. 1504473.8

(51) Int. Cl.
*F01D 9/04* (2006.01)
*F02C 9/20* (2006.01)
(Continued)

(52) U.S. Cl.
CPC ............. *F01D 17/14* (2013.01); *F01D 9/041* (2013.01); *F01D 17/162* (2013.01); *F01D 17/20* (2013.01); *F01D 21/003* (2013.01); *F02C 9/20* (2013.01); *F05D 2220/32* (2013.01); *F05D 2260/74* (2013.01); *F05D 2260/79* (2013.01); *F05D 2270/101* (2013.01);
(Continued)

(58) Field of Classification Search
CPC ........ F01D 17/14; F01D 9/041; F01D 17/162; F01D 17/20; F01D 21/003; F02C 9/20; F05D 2220/32; F05D 2260/74; F05D 2270/101; F05D 2270/3061; F05D 2270/52; F05D 2270/60; F05D 2270/62
See application file for complete search history.

(56) References Cited

U.S. PATENT DOCUMENTS

| 2,784,935 A | 3/1957 | Cohen |
| 7,700,907 B2 | 4/2010 | Braun et al. |

(Continued)

FOREIGN PATENT DOCUMENTS

| EP | 1988258 A2 | 11/2008 |
| EP | 2128408 A2 | 12/2009 |

(Continued)

*Primary Examiner* — Richard A Edgar
(74) *Attorney, Agent, or Firm* — Oliff PLC

(57) ABSTRACT

A variable vane control system for controlling the angle of rotation of a circumferential row of variable vanes of a gas turbine engine. The control system includes a mechanical linkage operable to rotate the variable vanes, one or more actuators for operating the linkage and one or more position sensors for detecting the respective actuation positions of the one or more actuators. The control system further includes a linkage position signalling switch for signalling that the mechanical linkage is at a calibration position corresponding to a predetermined rotation angle of the vanes. The control system further includes a controller for controlling the one or more actuators and thereby controlling the angle of rotation of the vanes, based on the detected actuation positions which the controller correlates with vane rotation angle. The controller further corrects the correlation between the detected actuation positions and vane rotation angle on receipt of a signal from the linkage position signalling switch indicating that the mechanical linkage is at the calibration positionvanes.

13 Claims, 5 Drawing Sheets

(51) Int. Cl.
*F01D 17/14* (2006.01)
*F01D 17/16* (2006.01)
*F01D 21/00* (2006.01)
*F01D 17/20* (2006.01)

(52) U.S. Cl.
CPC .. *F05D 2270/3061* (2013.01); *F05D 2270/52* (2013.01); *F05D 2270/60* (2013.01); *F05D 2270/62* (2013.01); *F05D 2270/80* (2013.01)

(56) References Cited

U.S. PATENT DOCUMENTS

| | | |
|---|---|---|
| 8,528,207 B2 | 9/2013 | Lozier |
| 8,857,070 B2 | 10/2014 | Niederbremer |
| 8,881,584 B2 | 11/2014 | Spanos et al. |
| 2009/0108793 A1 | 4/2009 | Sanders et al. |
| 2013/0084179 A1* | 4/2013 | Mantese ............... F01D 17/162 416/1 |

FOREIGN PATENT DOCUMENTS

| | | |
|---|---|---|
| EP | 2383439 A2 | 11/2011 |
| EP | 2574733 A2 | 4/2013 |
| GB | 2461553 A | 1/2010 |
| WO | 2009/010711 A1 | 1/2009 |

* cited by examiner

VARIABLE VANE CONTROL SYSTEM

FIELD OF THE INVENTION

The present invention relates to a variable vane control system for controlling the angle of rotation of a circumferential row of variable vanes of a gas turbine engine.

BACKGROUND

The airflow through a gas turbine engine is managed by a series of vanes and bleed valves. The vanes typically comprise variable stator vanes (VSVs) and variable inlet guide valves (VIGVs), both of which can be rotated about their longitudinal axes to control the airflow through the engine. This rotation is typically controlled by remote actuators operating mechanical linkages which in turn rotate the vanes.

Accurate control of the vane rotational angle is required to optimise the airflow through the engine and to ensure efficient running of the engine. For example, if VSVs are excessively open the engine may surge, whereas if they are not sufficiently open the engine will not run efficiently and the specific fuel consumption will be greater than desired.

Electrical position sensors could be fitted directly onto the variable vanes for use in accurately controlling their rotation. However, such an approach can be compromised by the harsh operating conditions within the engine. Therefore, a variable vane control system as shown in FIG. 1 may be used. The system 125 has a mechanical linkage 127, typically including a unison ring, operable to rotate a circumferential row of variable vanes. The mechanical linkage 127 is connected to e.g. piston-based actuator(s) 129 such that the actuator(s) 129 can control the angle of rotation of the vanes. In addition, a linear variable differential transducer (LVDT) position sensor 131 may be attached to the, or each, actuator 129 to detect the actuation position of the actuator 129. A controller 133 controls the actuator(s) 129 and thereby controls the angle of rotation of the vanes, the controller 133 receiving the detected actuation position(s) which it correlates with the vane rotation angle.

To improve the accuracy of the system, a time-consuming and expensive rigging procedure can be implemented. The procedure includes shimming the actuator during production assurance testing to calibrate the LVDT reading to the physical actuator position and carrying out an LVDT calibration check. Additional rigging features can be incorporated into the actuator so that a specialist rigging tool can be used to lock the actuator piston at specific positions relative to the actuator body. Similarly, when such an actuator is installed on an overhauled engine, the actuator is re-locked at the rigging position and the vanes locked into an equivalent position before the actuator is connected to the variable vanes via a linkage of adjustable length.

Despite this time-consuming rigging procedure, however, there still remain many factors that are difficult to accurately account for when the detected actuator position is correlated to the vane rotation angle. These factors include: engine electronic controller (EEC) and LVDT electrical errors; calibration and rigging allowances during assembly of the engine; and backlash effects within the mechanical linkage. In an attempt to allow for these factors, actuators are controlled with a safety margin to ensure that surge does not occur. However the larger this margin is, the lower the engines running efficiency will be.

SUMMARY

In general terms, the present invention provides a system for calibrating the correlation between detected actuator positions and vane rotation angle.

Accordingly, in a first aspect, the present invention provides a variable vane control system for controlling the angle of rotation of a circumferential row of variable vanes of a gas turbine engine, the control system including:
  a mechanical linkage operable to rotate the variable vanes;
  one or more actuators for operating the linkage;
  one or more position sensors for detecting the respective actuation positions of the one or more actuators;
  a linkage position signalling device used for signalling that the mechanical linkage is at a calibration position corresponding to a predetermined rotation angle of the vanes; and
  a controller for controlling the one or more actuators and thereby controlling the angle of rotation of the vanes, based on the detected actuation positions which the controller correlates with vane rotation angle;
  wherein the controller corrects the correlation between the detected actuation positions and vane rotation angle on receipt of a signal from the linkage position signalling device indicating that the mechanical linkage is at the calibration position.

Advantageously, the system can thus eliminate or reduce errors associated with the electronic reading of actuator position, the actuator and engine assembly set-up, and rigging tolerances. This results in more accurate control of the vanes, allowing the actuator to be controlled with a smaller safety margin and the engine to be operated more efficiently.

In a second aspect, the present invention provides a gas turbine engine having a variable vane control system according to the first aspect.

Another aspect of the present invention provides the use of a system of the first aspect for operating a circumferential row of variable vanes of a gas turbine engine. For example a method may be provided for operating a gas turbine engine having a circumferential row of variable vanes, a mechanical linkage operable to rotate the variable vanes, and one or more actuators for operating the linkage, the method including the steps of:
  detecting the respective actuation positions of the one or more actuators;
  receiving a signal when the mechanical linkage is at a calibration position corresponding to a predetermined rotation angle of the vanes; and
  controlling the angle of rotation of the vanes by correlating the detected actuation positions with vane rotation angle;
  wherein the correlation between the detected actuation positions and vane rotation angle is corrected on receipt of the signal that the mechanical linkage is at the calibration position. The method thus corresponds to the system of the first aspect.

Optional features of the invention will now be set out. These are applicable singly or in any combination with any aspect of the invention.

Conveniently, the controller may correct the correlation between the detected actuation positions and vane rotation angle by:
  receiving the signal from the linkage position signalling device indicating that the mechanical linkage is at the calibration position;

recalling the predetermined rotation angle of the vanes corresponding to the mechanical linkage being at the calibration position;

detecting the actuation positions of the one or more actuators using the one or more position sensors, calculating the vane rotation angle which correlates with the detected actuation positions; and calculating a corrective offset for the correlation based on the difference between the calculated vane rotation angle and the predetermined vane rotation angle.

The controller may correct the correlation during normal operation of the engine, for example during engine starting, running or shut-down. Additionally or alternatively, the controller may run a specific calibration correction sequence, for example for use by engine ground maintenance personnel. In such a sequence, the one or more actuators can be command by the controller to move across their respective actuation strokes, or portions thereof, to permit calibration correction.

The controller may activate an alarm if the corrective offset exceeds a predetermined threshold.

The linkage position signalling device may be a switch, which preferably only signals (i.e. changes state) when the mechanical linkage is at the calibration position.

Conveniently, the linkage position signalling device may include first and second parts, the first part being attached to a component of the engine which is stationary relative to the mechanical linkage, and the second part being attached to and movable with the mechanical linkage such that the parts make signalling contact when the mechanical linkage is at the calibration position. For example, the first and second parts may be electrically contacting parts which make electrical signalling contact when the mechanical linkage is at the calibration position. One of the electrically contacting parts can be spring-mounted. As another example, one of the first and second parts may include a signalling switch part, and the other of the first and second parts may include a tripping part such that the tripping part changes the state of the signalling switch part when the mechanical linkage moves through the calibration position. As another example, the first and second parts may form a proximity sensor, thereby avoiding physical contact of the two parts.

The predetermined rotation angle of the vanes may equate to a relatively low power (e.g. cruise) or engine not running position. This can then reduce the potential for vibration-induced damage of the linkage position signalling device or vibration-induced sensing inaccuracies.

The system may include a plurality of linkage position signalling devices for signalling that the mechanical linkage is at the calibration position. This provides redundancy, and thus can improve the robustness of the system.

The system may include a plurality of linkage position signalling devices for signalling that the mechanical linkage is at respective calibration positions corresponding to respective and different predetermined rotation angles of the vanes. The controller can then correct the correlation between the detected actuation positions and vane rotation angle on receipt of signals from the linkage position signalling devices indicating that the mechanical linkage is at the respective calibration positions. In particular, such an arrangement can allow the system to correct to account for non-constant and/or non-linear errors.

The mechanical linkage may include a unison ring attached to the vanes such that rotation of the unison ring results in rotation of the vanes.

The vanes may be variable stator vanes or variable inlet guide vanes.

The, or each, position sensor may be a linear variable differential transducer position sensor, e.g. for use with a linear actuator. The, or each, position sensor may be a rotary variable differential transducer e.g. for use with a rotary actuator.

The controller may be an electronic engine control unit.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
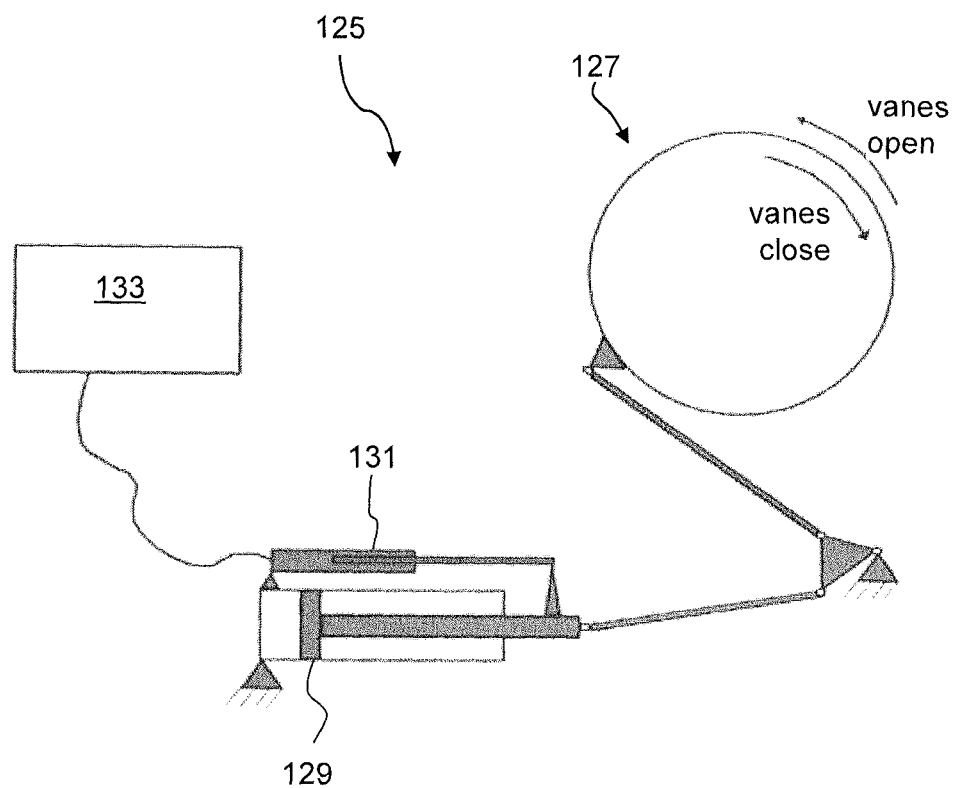
FIG. 1 shows schematically a variable vane control system.
Figure 2:
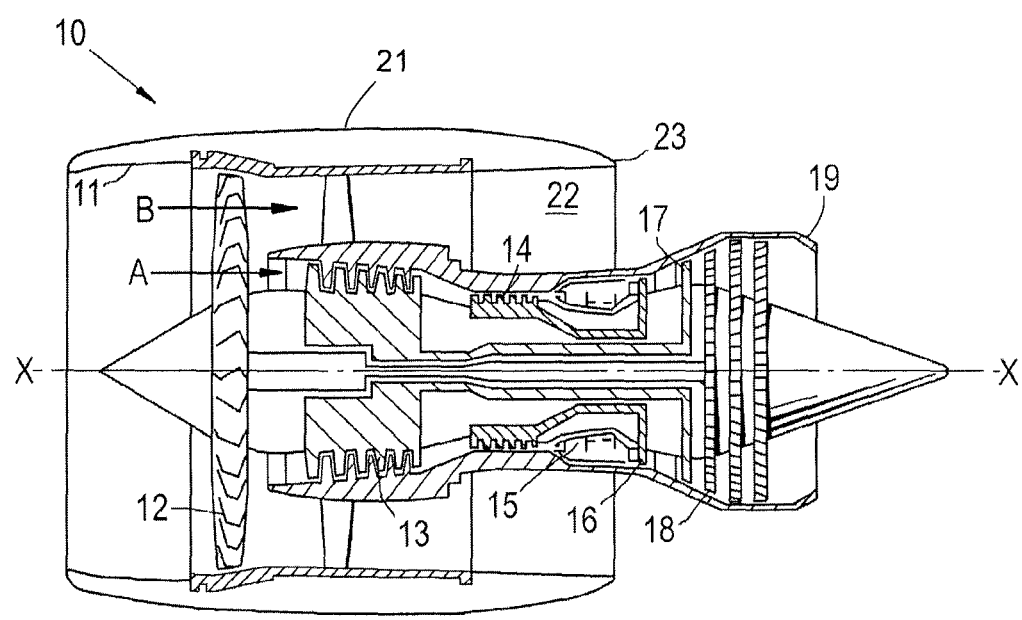
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 3:
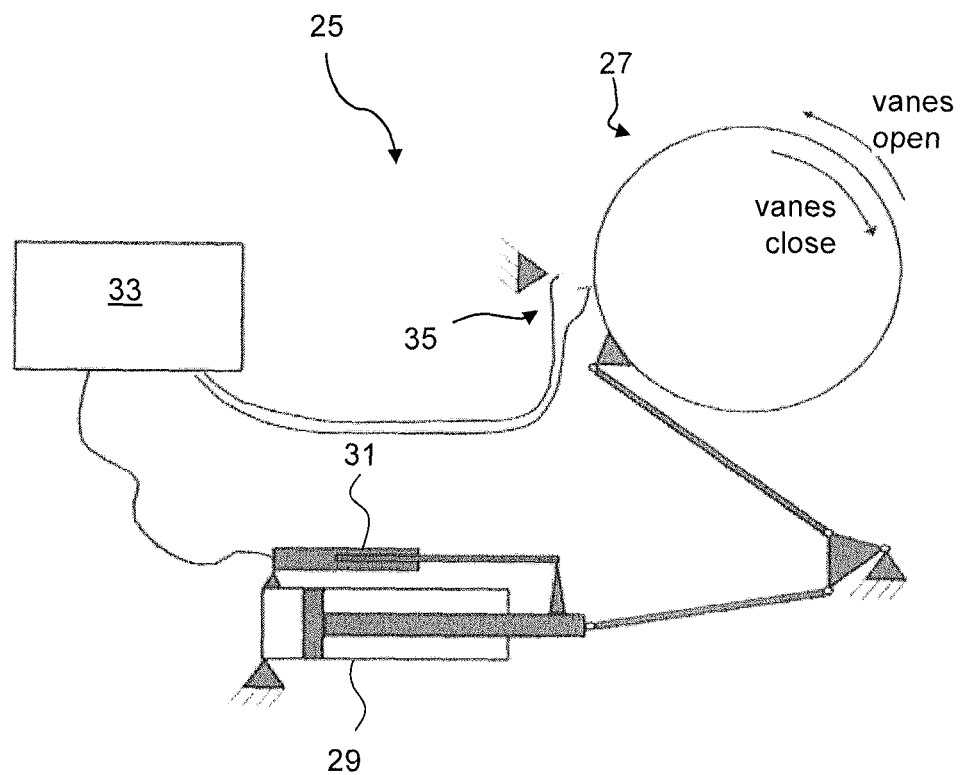
FIG. 3 shows schematically a variable vane control system according to the present invention with a two part, electrically contacting linkage position signalling device.

With reference to FIG. 3, a variable vane control system 25 has a mechanical linkage 27, typically including a unison ring, operable to rotate a circumferential row of variable vanes, such as variable stator vanes or variable inlet guide vanes of the engine of FIG. 2. The mechanical linkage 27 is connected to an actuator 29 such that the actuator can control the angle of rotation of the vanes. The actuator 29 may be a piston-based actuator, as illustrated. A position sensor 31 such as an LVDT is attached to the actuator 29 to detect the actuation position of the actuator 29. A controller 33 such as an EEC then controls the actuator 29 and thereby controls the angle of rotation of the vanes, based on the detected actuation positions which the controller 33 correlates with the vane rotation angle. The system may have a plurality of actuators 29 and position sensors 31, but in the following we refer to just one actuator and sensor.

The system 25 further includes a linkage position signalling device 35 for signalling that the mechanical linkage 27 is at a calibration position corresponding to a predetermined rotation angle of the vanes. This allows the controller 33 to correct the correlation between the detected actuation positions and vane rotation angle on receipt of a signal from the linkage position signalling device 35 indicating that the mechanical linkage 27 is at the calibration position.

Figure 4:
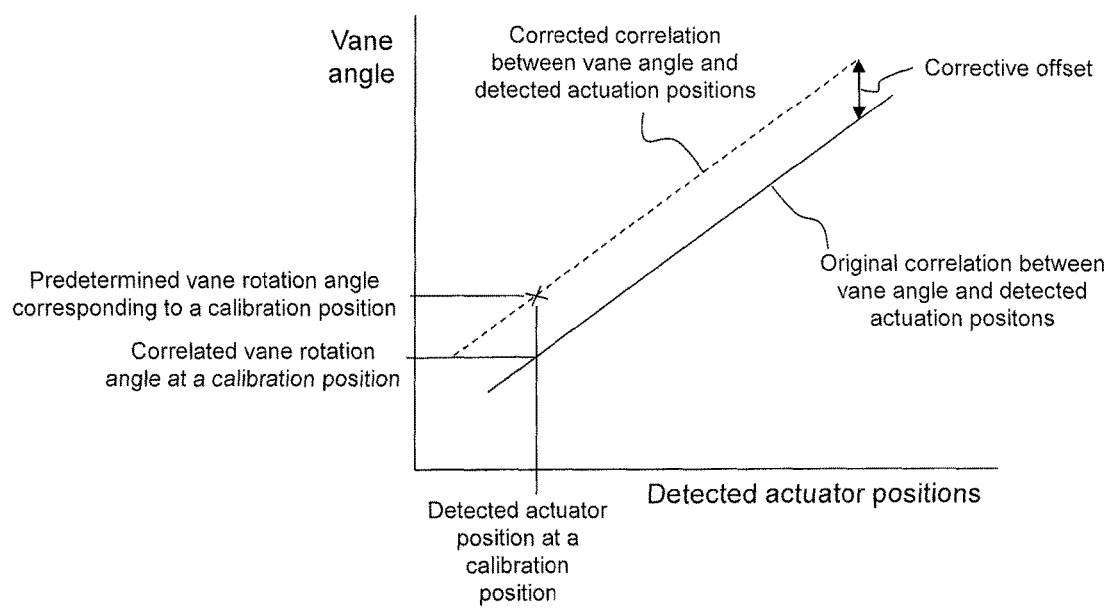
FIG. 4 shows a plot of the vane rotation angle against detected actuator positions and also indicates a predetermined vane rotation angle corresponding to a calibration position.

The correction may be performed as follows. The controller 33 receives a signal from the linkage position signalling device 35 indicating that the mechanical linkage 27 is at the calibration position. The controller 33 then recalls from memory the predetermined rotation angle of the vanes corresponding to the mechanical linkage 27 being at the calibration position. It detects the actuation position of the actuator 29 using the position sensor 31 and calculates the vane rotation angle which correlates with the detected actuation position. The controller 33 then calculates a corrective offset for the correlation based on the difference between the calculated vane rotation angle and the predetermined vane rotation angle. The corrective offset can then be used in subsequent control of the actuator. This correction of the correlation between the detected actuation positions and vane rotation angle is shown graphically in FIG. 4. The controller 33 may further activate an alarm if the corrective offset exceeds a predetermined threshold. Thus, the controller can monitor the health of the system 25.

In case of the controller 33 resetting with a running engine and having to recover control quickly, the corrective offsets determined during engine start can be stored in the controller 33 memory for quick recovery. Alternatively, the engine can temporarily be run with increased vane scheduling margins.

Advantageously the system can eliminate repeatable errors associated with the electronic reading of actuator position, the actuator and engine assembly set-up and the rigging tolerances. As a result, actuator control margins can be reduced, leading to improved engine running efficiency (0.1-0.2% improvements in specific fuel consumption may be achievable). Additionally, the system removes a need to carry out time-consuming actuator rigging procedures using costly tools. Further, if a plurality of position sensors 31 are employed, all of them can be synchronised at the same time using the controller 33.

Another use of the system 25 may be to measure the amount of backlash in the mechanical linkage 27. One approach to measuring backlash using the system 25 is to monitor the difference in the detected actuation position when calibration position is indicated by the linkage position signalling device 35 as the linkage rotates clockwise and anticlockwise. In this way it is also possible to monitor a change in backlash over time, leading to enhanced health monitoring.

Figure 5:
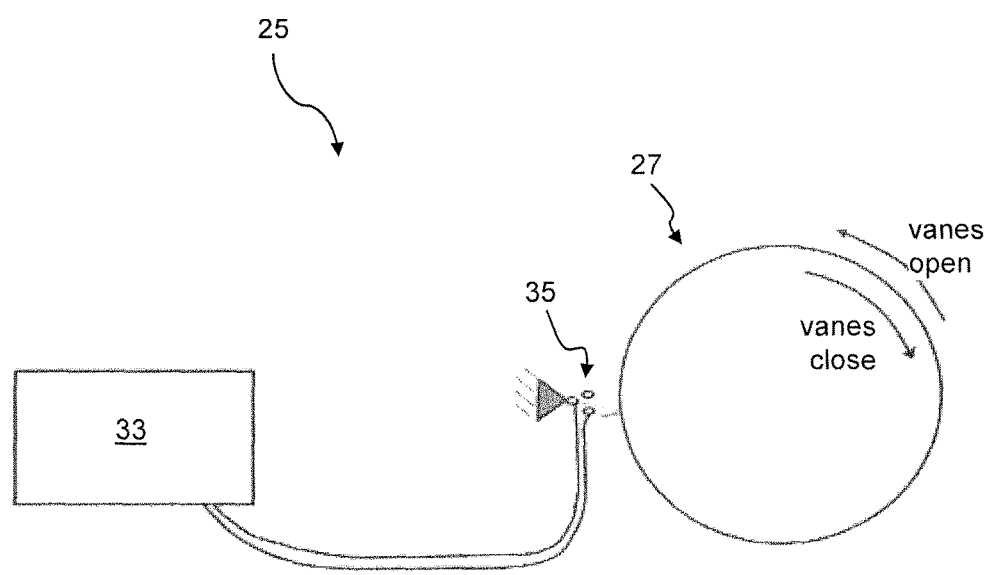
FIG. 5 shows schematically a variable vane control system according to the present invention with a linkage position signalling device including a switch and a tripping part.

The linkage position signalling device 35 may include first and second parts, the first part being attached to a component of the engine which is stationary relative to the mechanical linkage 27, and the second part being attached to and moveable with the mechanical linkage 27 such that the parts make signalling contact when the mechanical linkage 27 is at the calibration position. For example, the first and second parts may be electrically contacting parts which make electrical contact when the mechanical linkage is at the calibration position, as illustrated in FIG. 3. Advantageously, one of the electrically contacting parts can be spring-mounted to improve contact on travel of the mechanical linkage 27 past the calibration position. As another example, one of the first and second parts may include a signalling switch part, and the other of the first and second parts may include a tripping part such that the tripping part changes the state of the switch part when the mechanical linkage moves through the calibration position, as illustrated in FIG. 5, which shows a variant of the variable vane control system 25 (the piston-based actuator, LVDT first position sensor, and parts of the mechanical linkage other than the unison ring, are not shown in FIG. 5). If using any form of two part linkage position signalling device 35 which makes physical contact, it may be beneficial to use contacts tolerant of physical contamination, or which wipe and self-clean as they move towards, away from, or through the calibration position.

More generally, preferably the linkage position signalling device 35 is a switch (whether electrical, mechanical or other type) which only signals (e.g. changes state) when the mechanical linkage is at the calibration position. Relative to a device which continuously measures vane angle, a switch can improve the reliability of the variable vane control system 25, while providing the controller with enough information to correct the correlation between the detected actuation positions and vane rotation angle.

Preferably, the calibration position corresponds to a vane rotation angle which equates to a low power (e.g. cruise) or engine not running position, thereby reducing the potential for vibration-induced fretting damage of contacts or vibration-induced sensing inaccuracies. If the environment permits, a proximity sensor, such as a magnetic, inductive, capacitive or photoelectric proximity sensor, may be used as the linkage position signalling device thereby avoiding the problems associated with physical contact.

For an aero engine, one linkage position signalling device 35 per mechanical linkage may achieve a suitable balance of system availability relative to the weight/cost penalty of providing a device harness. However, this is not to exclude that it may be desirable to have multiple linkage position signalling devices 35 per mechanical linkage.

Thus, although not shown in the FIGS. 3 and 5, the system 25 may include a plurality of the linkage position signalling devices 35 for signalling that the mechanical linkage 27 is at the calibration position. This can be advantageous if the linkage position signalling devices 35 are located in areas of the engine where maintenance is difficult, as they then provide redundancy.

Another option is to include a plurality of linkage position signalling devices 35 per mechanical linkage, the devices signalling that the mechanical linkage 27 is at respective calibration positions corresponding to respective and different predetermined rotation angles of the vanes. The controller can then correct the correlation between the detected actuation positions and vane rotation angle on receipt of signals from the linkage position signalling devices 35 indicating that the mechanical linkage 27 is at the respective calibration positions. This can improve calibration accuracy and account for non-constant (or even non-linear) errors.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A variable vane control system for controlling the angle of rotation of a circumferential row of variable vanes of a gas turbine engine, the control system including:
   a mechanical linkage operable to rotate the variable vanes;
   one or more actuators for operating the linkage;
   one or more position sensors for detecting the respective actuation positions of the one or more actuators;
   a linkage position signalling switch for signalling that the mechanical linkage is at a calibration position corresponding to a predetermined rotation angle of the vanes; and
   a controller for controlling the one or more actuators and thereby controlling the angle of rotation of the vanes, based on the detected actuation positions which the controller correlates with vane rotation angle;
   wherein the controller corrects the correlation between the detected actuation positions and vane rotation angle on receipt of a signal from the linkage position signalling switch indicating that the mechanical linkage is at the calibration position.

2. A system according to claim 1, wherein the controller corrects the correlation between the detected actuation positions and vane rotation angle by:
   receiving the signal from the linkage position signalling switch indicating that the mechanical linkage is at the calibration position;
   recalling the predetermined rotation angle of the vanes corresponding to the mechanical linkage being at the calibration position;
   detecting the actuation positions of the one or more actuators using the one or more position sensors,
   calculating the vane rotation angle which correlates with the detected actuation positions; and
   calculating a corrective offset for the correlation based on the difference between the calculated vane rotation angle and the predetermined vane rotation angle.

3. A system according to claim 2, wherein the controller activates an alarm if the corrective offset exceeds a predetermined threshold.

4. A system according to claim 1, wherein the linkage position signalling switch includes first and second parts, the first part being attached to a component of the engine which is stationary relative to the mechanical linkage, and the second part being attached to and movable with the mechanical linkage such that the parts make signalling contact when the mechanical linkage is at the calibration position.

5. A system according to claim 4, wherein the first and second parts are electrically contacting parts which make electrical signalling contact when the mechanical linkage is at the calibration position.

6. A system according to claim 4, wherein one of the first and second parts includes a signalling switch part, and the other of the first and second parts includes a tripping part such that the tripping part changes the state of the switch part when the mechanical linkage moves through the calibration position.

7. A system according to claim 1, including a plurality of the linkage position signalling switches for signalling that the mechanical linkage is at the calibration position.

8. A system according to claim 1, including a plurality of linkage position signalling switches for signalling that the mechanical linkage is at respective calibration positions corresponding to respective and different predetermined rotation angles of the vanes;
   wherein the controller corrects the correlation between the detected actuation positions and vane rotation angle on receipt of signals from the linkage position signalling switches indicating that the mechanical linkage is at the respective calibration positions.

9. A system according to claim 1, wherein the mechanical linkage includes a unison ring attached to the vanes such that rotation of the unison ring results in rotation of the vanes.

10. A system according to claim 1, wherein the vanes are variable stator vanes or variable inlet guide vanes.

11. A system according to claim 1, wherein the, or each, position sensor is a linear or rotary variable differential transducer position sensor.

12. A system according to claim 1, wherein the controller is an electronic engine control unit.

13. A gas turbine engine having a variable vane control system according to claim 1.

* * * * *